(12) United States Patent
McCollum (10) Patent No.: US 7,553,435 B2
(45) Date of Patent: Jun. 30, 2009

(54) METHOD AND APPARATUS FOR MOLDING COMPOSITE ARTICLES

(75) Inventor: Robert P. McCollum, Transfer, PA (US)

(73) Assignee: VEC Industries, L.L.C., Minneapolis, MN (US)

( * ) Notice: Subject to any disclaimer, the term of this patent is extended or adjusted under 35 U.S.C. 154(b) by 819 days.

(21) Appl. No.: 11/039,358

(22) Filed: Jan. 19, 2005

(65) Prior Publication Data

US 2005/0184416 A1    Aug. 25, 2005

Related U.S. Application Data

(60) Provisional application No. 60/538,992, filed on Jan. 23, 2004.

(51) Int. Cl.
*B29C 45/76* (2006.01)
(52) U.S. Cl. ............... 264/40.5; 264/40.7; 264/264; 264/328.1
(58) Field of Classification Search ............... None
See application file for complete search history.

(56) References Cited

U.S. PATENT DOCUMENTS

| | | | |
|---|---|---|---|
| 604,258 A | 5/1898 | Menier |
| 2,139,631 A | 12/1938 | Dresch et al. |
| 2,367,779 A | 1/1945 | Hull |
| 2,401,299 A | 6/1946 | Glavin |
| 2,435,866 A | 2/1948 | Bilhuber |
| 2,658,237 A | 11/1953 | Cuppert et al. |
| 2,975,476 A | 3/1961 | Burke |
| 3,608,143 A | 9/1971 | Schutz |
| 3,733,161 A | 5/1973 | Nussbaum |
| 3,815,863 A | 6/1974 | Andeweg |
| 3,837,769 A | 9/1974 | Erlenbach |
| 3,840,312 A | 10/1974 | Paulson et al. |
| 3,976,415 A | 8/1976 | Hauser et al. |
| 4,017,572 A | 4/1977 | Magone et al. |
| 4,334,850 A | 6/1982 | Garabedian |
| 4,393,145 A | 7/1983 | Zemp |
| 4,444,832 A | 4/1984 | Mazzola et al. |
| 4,851,167 A | 7/1989 | Marc |
| 4,873,044 A | 10/1989 | Epel |
| 4,891,403 A | 1/1990 | Farris |

(Continued)

FOREIGN PATENT DOCUMENTS

DE    43 20 602 C1    5/1994

(Continued)

OTHER PUBLICATIONS

Article on "LPMC", *Superior Oil Company, Inc.*, 16 pages (Date unknown).

(Continued)

*Primary Examiner*—Monica A Huson
(74) *Attorney, Agent, or Firm*—Merchant & Gould P.C.

(57) ABSTRACT

A method and apparatus for molding composite articles can include a pair of opposed mold sections having first and second molding membranes that define a mold plenum. The mold sections have a thin-skin mold section configuration. Each mold section can be filled with a gas backing. The temperature of the mold plenum can be controlled by regulating the temperature of the gas backing.

10 Claims, 6 Drawing Sheets

U.S. PATENT DOCUMENTS

| | | | |
|---|---|---|---|
| 5,015,426 A | 5/1991 | Maus et al. |
| 5,055,025 A | 10/1991 | Muller |
| 5,061,418 A | 10/1991 | Ware |
| 5,075,393 A | 12/1991 | Thompson |
| 5,152,949 A | 10/1992 | Leoni et al. |
| 5,225,135 A | 7/1993 | Kia |
| 5,252,269 A | 10/1993 | Hara et al. |
| 5,268,049 A | 12/1993 | Marriott et al. |
| 5,380,776 A | 1/1995 | Hibbert |
| 5,460,761 A | 10/1995 | Larsson |
| 5,464,337 A | 11/1995 | Bernardon et al. |
| 5,494,426 A | 2/1996 | Ibar |
| 5,516,271 A | 5/1996 | Swenor et al. |
| 5,518,388 A | 5/1996 | Swenor et al. |
| 5,549,857 A | 8/1996 | Kamiguchi et al. |
| 5,614,135 A | 3/1997 | Maleczek |
| 5,637,630 A | 6/1997 | Atkins |
| 5,639,411 A | 6/1997 | Wilkins et al. |
| 5,695,848 A | 12/1997 | Wilkins et al. |
| 5,824,413 A | 10/1998 | Schell |
| 5,872,067 A | 2/1999 | Meng et al. |
| 5,883,021 A | 3/1999 | Beer et al. |
| 5,883,023 A | 3/1999 | Martine et al. |
| 5,900,311 A | 5/1999 | Campanella et al. |
| 5,906,788 A | 5/1999 | Boeckler |
| 5,908,596 A | 6/1999 | Wilkins et al. |
| 5,908,689 A | 6/1999 | Dana et al. |
| 5,910,458 A | 6/1999 | Beer et al. |
| 5,928,597 A | 7/1999 | Van Ert |
| 5,955,025 A | 9/1999 | Barrett |
| 5,971,742 A | 10/1999 | McCollum et al. |
| 6,143,215 A | 11/2000 | McCollum et al. |
| 6,149,844 A | 11/2000 | Graham |
| 6,257,867 B1 | 7/2001 | McCollum et al. |
| 6,287,493 B1 | 9/2001 | McCollum et al. |
| 6,558,592 B1 | 5/2003 | Nohara et al. |
| 6,623,672 B2 | 9/2003 | McCollum et al. |

FOREIGN PATENT DOCUMENTS

| | | |
|---|---|---|
| EP | 0 491 650 B1 | 5/1995 |
| EP | 0 744 263 A2 | 11/1996 |
| EP | 0 697 945 B1 | 9/1997 |
| GB | 879769 | 10/1961 |
| JP | 4-74620 | 3/1992 |
| WO | WO 96/07532 | 3/1996 |
| WO | WO 98/12034 | 3/1998 |

OTHER PUBLICATIONS

Carter, N., "Sheet Molding Compounds. Part I—Formulation, Processing, Part Design", *Plastics Design & Processing*, 5 pages (Feb. 1970).

"CCP online" product descriptions, http://www.ccponline.com/Composites/compprod.htm, 3 pages (Printed Apr. 10, 2000).

Delaney, A. et al., "Plastic Molding Apparatus", IBM Technical Bulletin, vol. 17, No. 2, pp. 479-480. (Jul. 1974).

Rosato, D. et al., "Injection Molding Handbook", *Van Nostrand Reinhold Co.*, pp. 210. (1986).

METHOD AND APPARATUS FOR MOLDING COMPOSITE ARTICLES

CROSS-REFERENCE TO RELATED APPLICATIONS

This application claims the benefit of U.S. Provision Application No. 60/538,992 filed on Jan. 23, 2004; which application is incorporated herein by reference.

TECHNICAL FIELD

This disclosure relates generally to the manufacture of injection-molded articles. More particularly, this disclosure relates to methods and apparatus for injection molding polymer and composite articles.

BACKGROUND

The present disclosure relates to the manufacture of injection molded articles. Such articles can be molded from a polymer thermoset resin or can be a composite, that is, can be made of a fiber reinforcement lattice within a cured resin matrix. More particularly, the present disclosure relates to a method and apparatus for injection molding such polymer and composite articles.

Reaction injection molding and resin transfer molding are processes wherein dry fiber reinforcement plys (preforms) are loaded in a mold cavity having surfaces that define the ultimate configuration of an article. In such processes, a flowable resin is injected, or vacuumed, under pressure into the mold cavity (mold plenum) to produce the article, or to saturate/wet the fiber reinforcement preforms. After a period of curing, the finished article is removed from the mold plenum.

What is needed in the industry is an injection molding apparatus that is easier and less costly to operate. In addition, it is desirable to improve article quality and shorten production cycle time offering increased temperature control during both endothermic and exothermic processes.

SUMMARY

In one aspect, the present disclosure relates to a method of molding an article including attaching first and second membranes to first and second rigid mold sections to define first and second chambers and a mold plenum between opposing surfaces of the first and second members. The method also includes filing and pressurizing the first and second chambers with a gas backing at a gas pressure level, injecting molding fluid into the mold plenum. The gas pressure within the mold plenum is monitored during the molding of the article.

In another aspect, the present disclosure relates to an injection molding apparatus including a first thin membrane coupled to a first rigid mold section to define a first gas pressure chamber, and a second thin membrane coupled to a second rigid mold section to define a second gas pressure chamber. A mold plenum is defined between the first and second thin membranes. The apparatus further includes an injection sprue in fluid communication with the mold plenum and at least one sensor interconnected to the one of the first mold section, the second mold section, and the mold plenum, the sensor being configured to detect a parameter indicative of an amount of molding fluid injected into the mold plenum.

A variety of examples of desirable apparatus features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Figure 1:
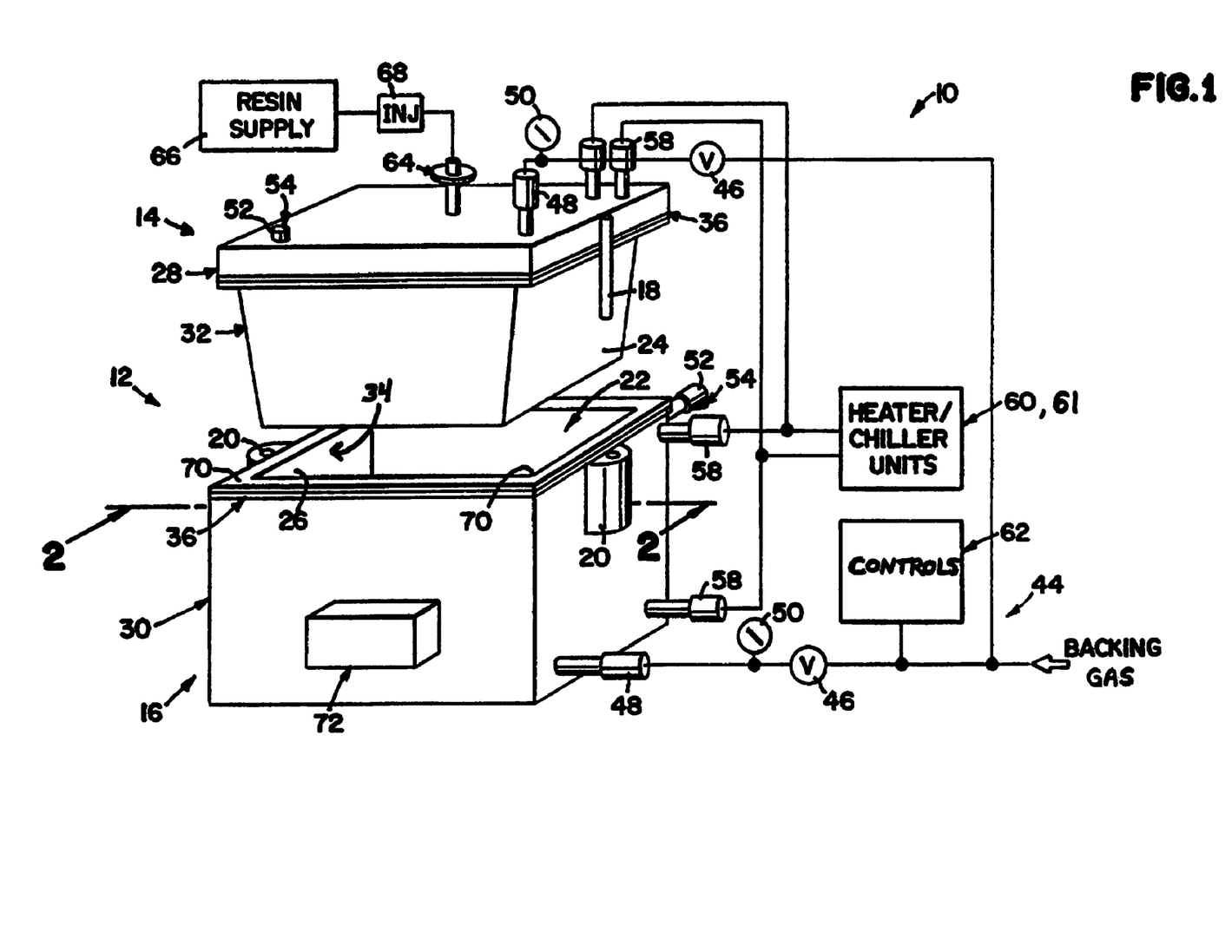
FIG. 1 is a partially diagrammatic, partially exploded isometric view of an injection molding apparatus in accordance with the present disclosure.

Referring to FIG. 1, one embodiment of an apparatus 10 for molding a composite article is illustrated. The apparatus 10 includes a mold assembly 12 having an upper mold section 14 and a lower mold section 16. The upper mold section 14 is configured to couple with the lower mold section 16 to define a mold plenum 22 with matched molding surfaces 24, 26. The upper and lower mold sections 14, 16 can be coupled with the aid of locating pins 18 and complimentary pin receivers 20.

Figure 2:
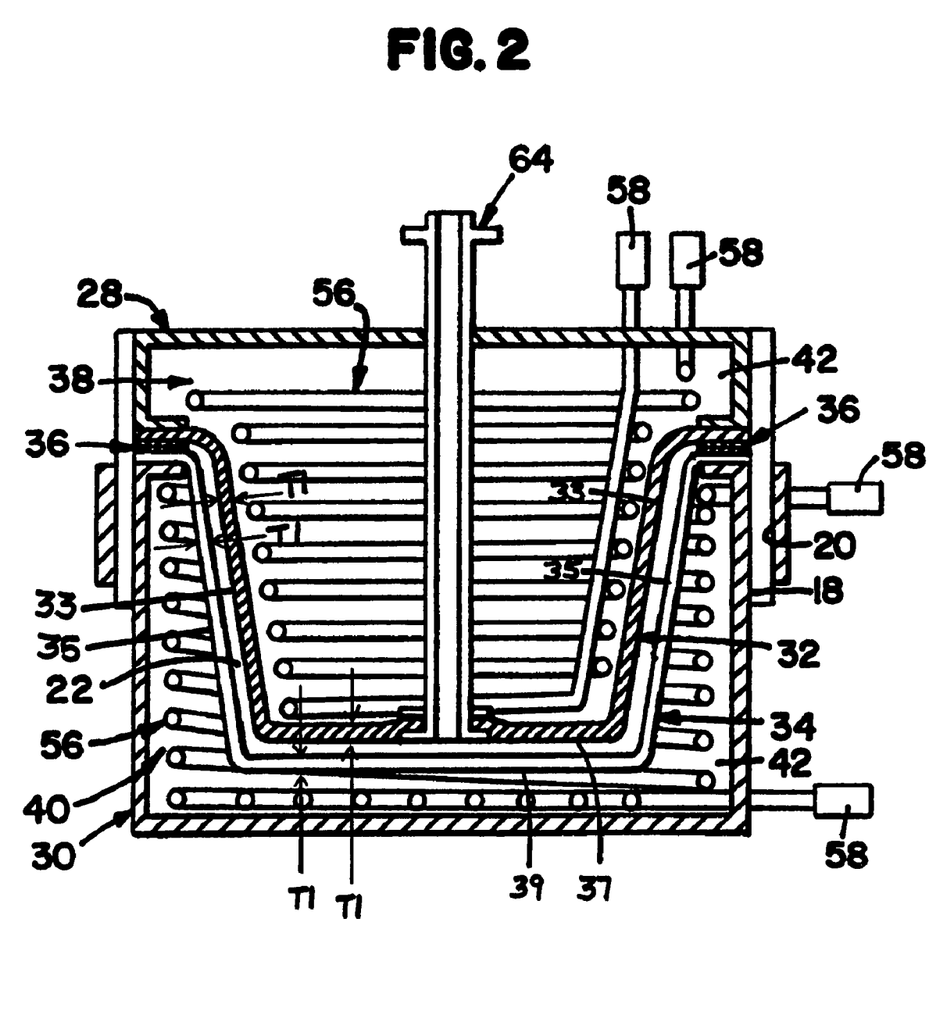
FIG. 2 is a cross-sectional view of the apparatus shown in FIG. 1, taken along line 2-2, subsequent to assembly of an upper mold section onto a lower mold section.

The upper and lower mold sections 14, 16 each include a rigid housing 28, 30 and a semi-rigid membrane 32, 34. In one embodiment, the semi-rigid membrane 32, 34 is removably and sealably secured to the respective rigid housing 28, 30 along the membrane's peripheral edge by a flange 36. The flange 36 can have an inner periphery having a geometry which corresponds to the geometry of the semi-rigid membrane 32, 34 and an outer periphery having a geometry corresponding to the geometry of the housing 28, 30. In a preferred embodiment, the flange 36 is reusable so that when a semi-rigid membrane 32, 34 is replaced, the flange 36 can be detached from the old membrane and attached to a new membrane. Once assembled, the housings 28, 30 and membranes 32, 34 of each mold section 14, 16 cooperate to define gas-tight chambers 38, 40 (FIG. 2).

In accordance with one feature of the present disclosure, each membrane 32, 34 is preferably a thin-skin configuration and formed of a composite overlay. The thin-skin configuration of the membrane is preferably of a thickness that reduces the overall weight of the apparatus as compared to conventional molding equipment. Further, as will be discussed in greater detail, the thin-skin configuration is also configured to reduce cycle time by increasing the rate of thermal communication during endothermic and exothermic processes.

The semi-rigid membranes 32, 34 may be formed of fiber reinforced plastics, although other suitable materials such as light sheet metal, may also be used. In this regard, it is noted that the use of either the same or different materials for the respective membranes 32, 34 of each mold section 14, 16 is contemplated depending upon, for example, the desired characteristics of the membranes (e.g., its thermal conductivity, formability, and usable life), the desired characteristics of the fabricated article (e.g., surface finish and gloss), and/or overall process parameters (e.g., resin injection pressures, resin cure time and mold assembly cycle time).

In one embodiment, each of the thin-skin, semi-rigid membrane 32, 34 has an overall thickness T1, although the disclosed principles can be applied in a variety of thicknesses and applications. The thickness T1 of the thin-skin membranes is generally defined as the average wall thickness T1 along a central region of each sidewall 33, 35 and bottom wall 37, 39, and is preferably between 0.3 and 1.0 cm (0.100 and 0.400 inches). In some applications, it may be desirable to have thin-skin membranes of different thickness rather than thin-skin membranes having the same average wall thickness T1 as illustrated.

In use, each mold section 14, 16 is filled with a backing gas 42 supplied by a gas supply network 44 (FIG. 1). When the mold sections 14, 16 are adequately filed, the gas 42 supports each membrane 32, 34 in compression during resin injection in a manner to be further described below.

In the embodiment shown in FIG. 2, the membrane backing gas 42 is supplied by the network 44 (FIG. 2) to the upper and lower mold sections 14, 16 through respective inlet control valves 46 and quick connect couplings 48. A pressure gauge 50 may be positioned downstream of each inlet valve 46 to monitor the flow rate of backing gas 42 into the chamber 38, 40 of each mold section 14, 16. To facilitate the discharge of backing gas 42 from the chambers 38, 40, each mold section 14, 16 can have a vent 52 through which the backing gas 42 may be exhausted. A vent valve 54 seals the chamber's vent 52 when pressurization is required. The vent valve 54 may include a pressure relief arrangement to reduce or limit undesired pressure build up within the chambers 38, 40 and control discharge of the backing gas 42 from the mold sections 14, 16.

As shown in FIG. 2, wherein the relative dimensions of, for example, the membranes 32, 34 and mold plenum 22 are exaggerated for ease of illustration, each mold section 14, 16 is provided with a system of heating/cooling coils 56 extending within the gas-tight chambers 38, 40 for regulating the temperature of the mold plenum 22. The optional heating/cooling coils 56 can be coupled via quick connect couplings 58 to an external heater 60 and chiller 61 (FIG. 1) units of conventional design. As such, the coils 56 operate in conjunction with the heater 60 and chiller 61 units to precisely regulate the temperature of the backing gas 42 and, hence, the molding surface 24, 26 of each membrane 32, 34 during the injection molding process.

The thermal conductivity of the backing gas 42 enables substantial design variation with respect to placement of the coils 56 within each mold section 14, 16. This, in turn, permits use of a given mold section 14, 16 and coil system 56 with a wide variety of membrane 32, 34 configurations.

In the some applications, the backing gas 42 is supplied at a temperature different from the desired process temperature. The vent 52 of the apparatus 10 through which the backing gas 42 is exhausted may be used to accommodate the varying temperature and pressure changes during manufacturing process. Thus, during heating or cooling of each mold section 14, 16 to the desired temperature, any resulting thermal expansion of the backing gas 42 within the chambers 38, 40 is accommodated by a pressure relief valve, for example, of the vent 52 to prevent distortion and/or deleterious stress on the membranes 32, 34. In an alternative embodiment, a pressure relief valve or arrangement (not shown) may be located prior to the coupling 48 of the apparatus 10, or anywhere along the apparatus where thermal expansion of the backing gas 42 can be controlled.

Preferably, the apparatus 10 includes a controller 62 (FIG. 1) that monitors and/or regulates the pressure of the backing gas 42. For example, a compressor (not shown), the control valve 46, the pressure gauge 50, and the chamber vent 52 may all be interconnected to the controller 62 and operated according to a particular manufacturing procedure, for example. Various sensors may be used to provide feedback for monitoring and regulating the pressure of the backing gas 42; the sensors being in communication with the controller 62. Such sensors can include, for example, pressure gauges located at various points in the system and chambers, strain gauges, or other sensors/gauges that provide feedback information related to the backing gas pressure.

The controller can be used to precisely control and vary the pressure of the backing gas 42 within the chambers 38, 40. A preferred manufacturing cycle may include changing the backing gas pressure within the chambers 38, 40 at predetermined times during the manufacturing cycle. The pressures may range between 2 psi and 10 psi, for example, during a manufacturing cycle. In one embodiment, the controller 62 is programmed to automatically monitor and regulate the manufacturing cycle in accord with predetermined pressure values. Likewise, sensors, and components such as the heater/chiller units 60, 61, can also be interconnected to the controller 62 for monitoring and regulation of the backing gas temperature.

As shown in FIG. 2, an injection sprue 64 extends through the upper mold section 14 to provide a pathway through which a desired thermoset resin from a molding fluid supply 66 (FIG. 1) may be injected. The resin is injected in the mold plenum 22 under pressure by a injection pump 68. The number and placement of such sprues 64 can vary depending upon the configuration and desired characteristics of the article to be molded and the flow characteristics of the molding fluid employed. A series of small vents 70 (FIG. 1) is provided between the opposed flanges 36 of the upper and lower mold sections 14, 16 to blend trapped air from the mold plenum 22 to the atmosphere during injection of the molding fluid into the mold plenum 22. Other conventional methods of bleeding trapped air from the mold plenum 22 may be used.

In accordance with another feature of the present disclosure, the molding apparatus 10 can further include a mechanism indicated generally by reference numeral 72 (FIG. 1) for vibrating the mold assembly 12. Vibration of the mold assembly 12 during injection of the resin can facilitate resin flow through the mold plenum 22, and may also improve saturation and wetting of any fiber reinforcement preforms situated within the mold plenum. The mechanism 72 can be positioned on the lower mold section 16 as illustrated, or the upper mold section 14.

In use, one or more fiber reinforcement preforms are laid within the mold cavity defined by the "female" molding surface 26 of the lower mold section 16. The upper mold section 14 is then lowered onto the lower mold section 16 to engage locational alignment hardware on each mold section 14, 16, such as locating pins 18 and respective pin receivers 20. If desired, the upper mold section 14 can then be secured to the lower mold section 16 by use of suitable clamps (not shown). Each mold section 14, 16 is then connected to the backing fluid supply network 44 and the inlet valve 46 is operated to adequately fill the chamber 38,40 with backing gas before injection molding of the articles begins.

During manufacture of a number of articles, the mold sections 14, 16 may be filled with the backing gas 42 only once prior to beginning the injection process. It is not necessary to fill each mold section 14, 16 after removing the molded article to then refill the sections before molding additional articles. As can be understood, by using the backing gas 42, the apparatus 10 is significantly lighter than an apparatus having a backing liquid, for example. This permits an operator to more easily transport or manipulate the mold sections 14, 16 of the present apparatus 10. In addition, by using backing gas 42, the chambers fill more quickly and evenly than an apparatus that uses backing liquid. This increases production cycle time and manufacturing efficiency.

Once the chambers 38, 40 are adequately filled with the backing gas 42, the controller 62 and the heater 60 and chiller 61 units are operated to bring each mold section 14, 16 to the desired process temperature and pressure. When the desired process temperature and pressure are reached, an amount of molding fluid is injected into the mold plenum 22. Injecting a proper amount of molding fluid can be visually confirmed by discharge of the molding fluid through air bleeds formed in the flanges 36 of each mold section 14, 16. In the alternative, sensors can be used to determine the proper injection amount. The use of feedback from different types of sensors to optimize the molding process is discussed below in more detail.

The temperature of each molding surface 24, 26 can be regulated via operation of the heater 60 and chiller 61 units to thereby provide an optimum cure rate with which to obtain the desired surface finish and/or other desired characteristics of the finished article, or to otherwise optimize the molding process. The mold sections 14, 16 are thereafter separated, and the finished article can be removed from the mold cavity manually or using automatic injectors.

In accordance with another feature of the present invention, due to the thin-skin configuration of the membranes 32, 34, the membranes can dimensionally flex slightly during the injection of molding fluid as the backing gas 42 distributes the resulting injection pressure load across the entire surface of the membranes 32, 34. In this manner, the thin-skin membranes 32, 34 avoid deleterious stress concentrations on the molding surfaces 24, 26 during injection. Further, the flexing of the molding surfaces 24,26 of one or both membranes 32, 34 during injection is believed to further improve or enhance the flow of molding fluid through the mold plenum 22, which effect may be enhanced by deliberately pulsing the injected molding fluid, or altering the backing gas pressure within the chambers, all without deleterious impact on the molding tools (i.e. the membranes 32, 34).

Figure 3:
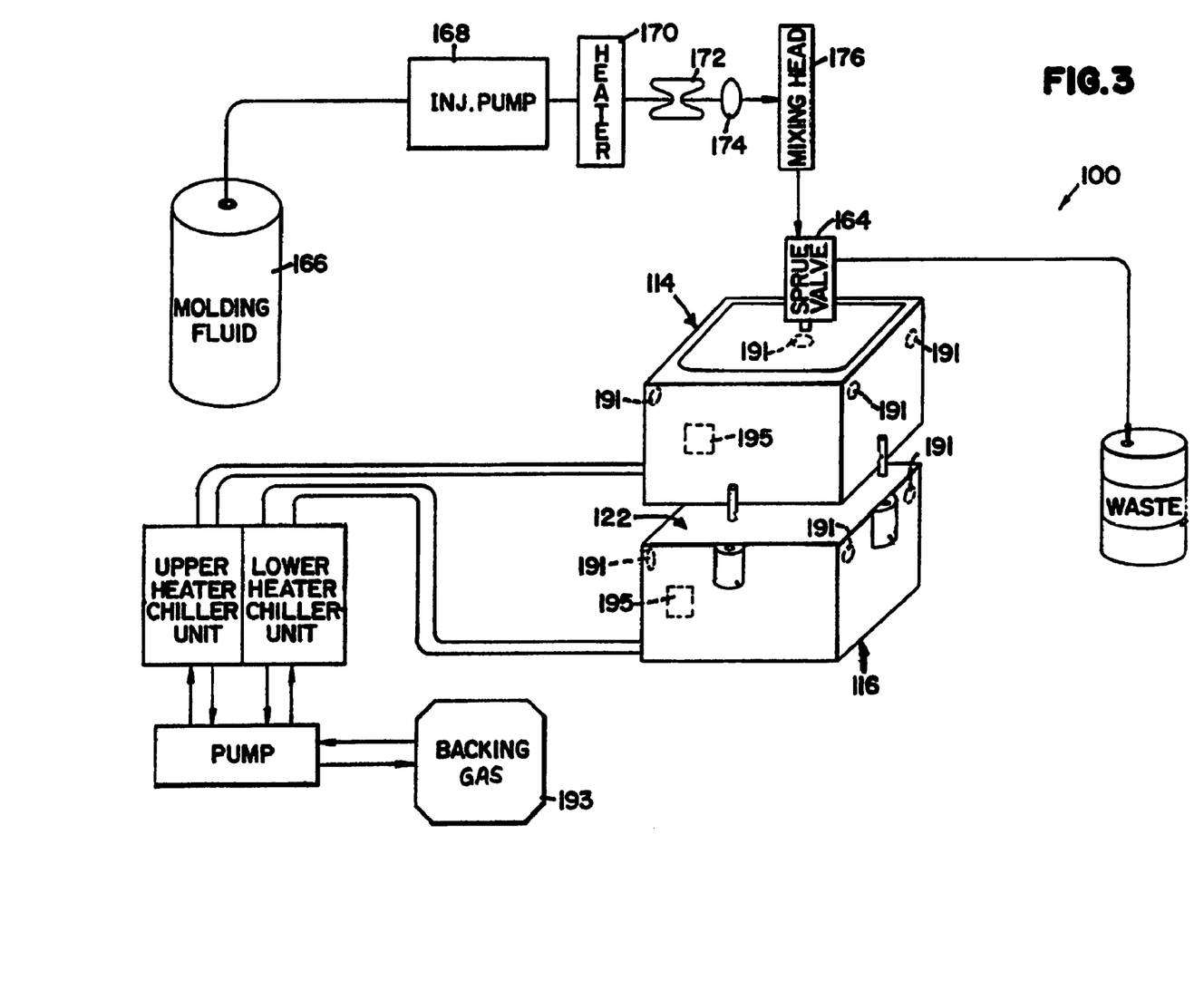
FIG. 3 is a partially diagrammatic, partially exploded isometric view of another embodiment of an injection molding apparatus similar to FIG. 1, but further including devices for providing feedback during the molding process.

To optimize the molding process, various devices can be employed to provide feedback that can be utilized to adjust different parameters of the molding process, such as injection rate, to improve the quality of the molded article. A second exemplary molding apparatus 100 is shown in FIG. 3, having a mold assembly 112 with mold sections 114, 116 similar to the molding apparatus 10 shown in FIG. 1. As shown, molding fluid can be delivered from a molding fluid storage container 166 by an injection pump 168. The system can also preferably include a resin heater 170, flowmeter 172, pressure sensor 174 and mixing head 176 between the pump 168 and the injection sprue 164.

The molding apparatus 110 can also include certain preferred devices for providing feedback to optimize the molding process. Both internal and external devices can be employed to provide feedback for use in monitoring and optimizing the molding process while injection is ongoing. Sensors internal to the mold can include, for example, temperature sensors 191 which can be provided at multiple locations in each mold section 114, 116 to monitor the temperature in the mold plenum 122. The temperature sensors can be devices well known to those of skill in the art, such as RTDs and thermocouples. Other internal feedback systems can include pressure transducers 195 within the mold sections 114, 116 and passive sensors 198 (FIG. 5) within the mold plenum 122 itself for detecting the progress of the molding fluid as it fills the mold plenum 122. These passive sensors 198 are shown, in FIG. 5, as positioned, for example, on the male mold membrane 200. However, the passive sensors 198 could also be located on the female mold membrane 203 or on both membranes.

The pressure transducers 195, sense the pressure in the mold sections 114, 116 while molding fluid is being injected into the mold plenum 122 and provide feedback indicative of the pressure in the mold plenum 122. As the plenum 122 is filling with molding fluid, pressure sensed in the mold section 114, 116 will typically gradually increase. However, as the mold plenum 122 becomes substantially filled, the pressure sensed will generally increase relatively sharply. The relatively sharp increase in pressure indicates that the plenum 122 is substantially full and the injection process can be regulated accordingly. Additionally, pressure sensors could be provided to sense pressure associated with mold plenum itself by, for example, providing sensors on the one or both of the mold membranes 200, 203.

The passive sensors 198 can be arranged to detect the leading edge of the molding fluid as it fills the mold plenum 122. Such passive sensors 198 can be passive proximity switches. These switches are designed to detect the leading edge of the flow without impeding that flow through the mold plenum 122. The passive proximity switches can be of the types well known to those skilled in the art, a preferred type being, for example, a capacitive proximity switch.

Additionally, external devices can also be provided for sensing various other parameters during the injection process. For example, linear velocity/displacement transducers (LVDTs) can be provided to detect when all or a part of the mold plenum has filled. The LVDTs detect displacement between the two mold sections 114, 116 when molding fluid is being injected into the mold plenum 122. The amount of displacement is indicative of whether, and how much, the mold plenum has filled. Such LVDTs as utilized herein are well known to those of ordinary skill in the art.

The flow meter 172 can be employed to monitor the flow rate of the molding fluid as is being injected. Moreover, the pressure gauge 174 can be provided to measure the pressure at which the molding fluid is being injected. If the injection pressure falls outside of a desired range of pressure, the injection rate can be adjusted accordingly. Another device for optimizing the molding process is the molding fluid heating unit 170 which can be used to heat the molding fluid. Heating the molding fluid can alter its viscosity and thus change the flow rate. As shown in FIG. 3, the heating unit 170 can preferably be positioned in the system between the injection pump 168 and the flowmeter 172 so that the change in flow rate caused by the heater 170 can be monitored.

Feedback from all of the aforementioned internal and external devices can be advantageously utilized to optimize the molding process even as the molding fluid is being injected. Together, the sensors form a response system which is designed to close the loop between CNC injection machinery and the floating mold. This response system, in conjunction with controller 62, for example, permits injection profiles to be adjusted dynamically based on actual mold conditions and parameters in order to optimize the injection process even as the mold plenum 122 is being filled with molding fluid. This ability to dynamically control and optimize the molding process also contributes to reduced cycle time and improved cosmetics of the molded part as well as reduced wear on tooling.

The hollow gas filled mold sections 14, 16, 114, 116 provide excellent thermal conductivity which permits superior mold temperature control. The controlled temperature ranges permit the rheology to be much faster in cycle times and provides the added bonus of the chemical reaction's optimal control limits being unaffected by ambient temperature ranges that can otherwise effect production rates.

Figure 4:
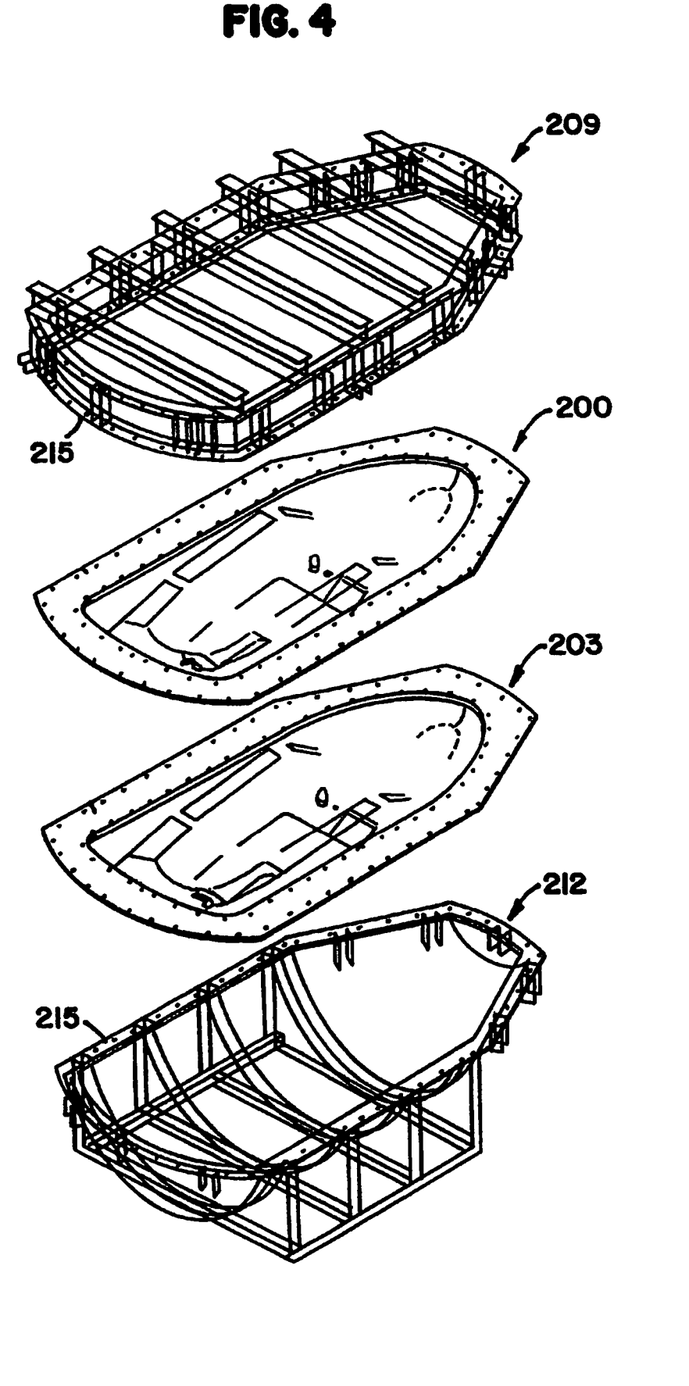
FIG. 4 is an exploded perspective view of an embodiment of the apparatus in FIG. 1 used for molding boat hulls.
Figure 5:
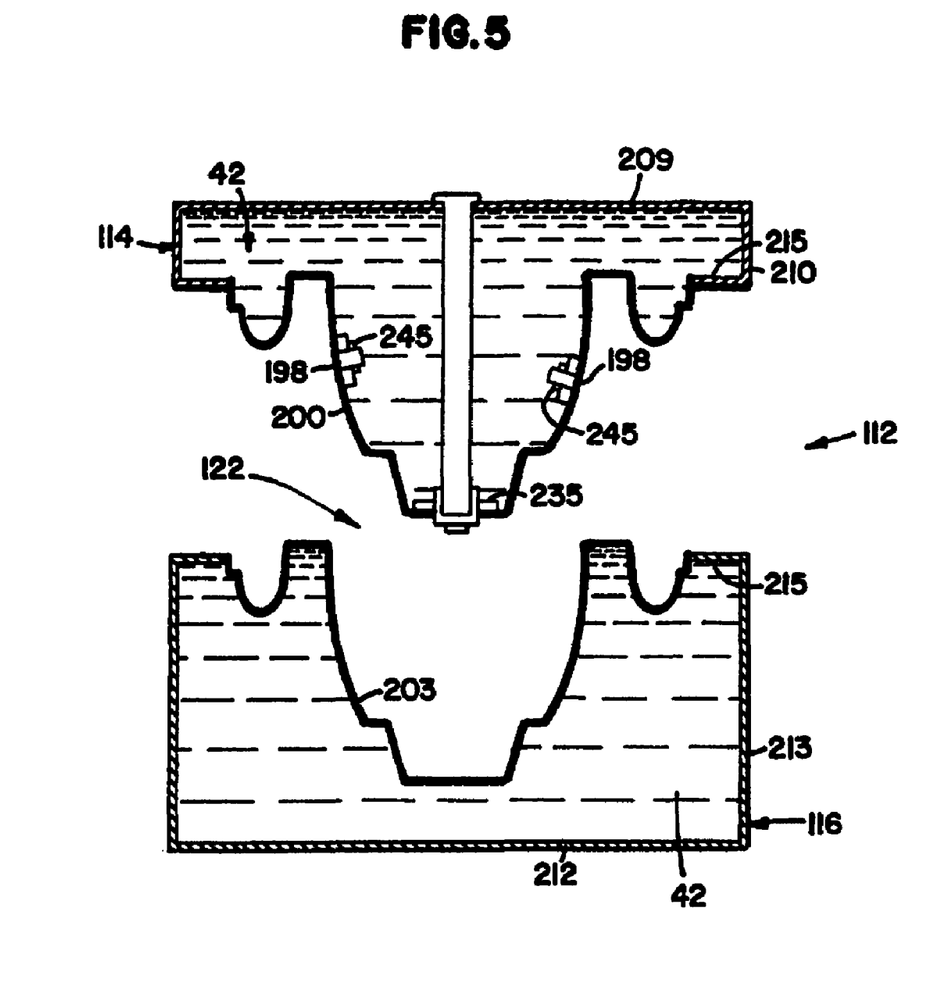
FIG. 5 is a cross sectional view, similar to FIG. 2, of the apparatus embodiment shown in FIG. 4 subsequent to partial assembly.
Figure 6:
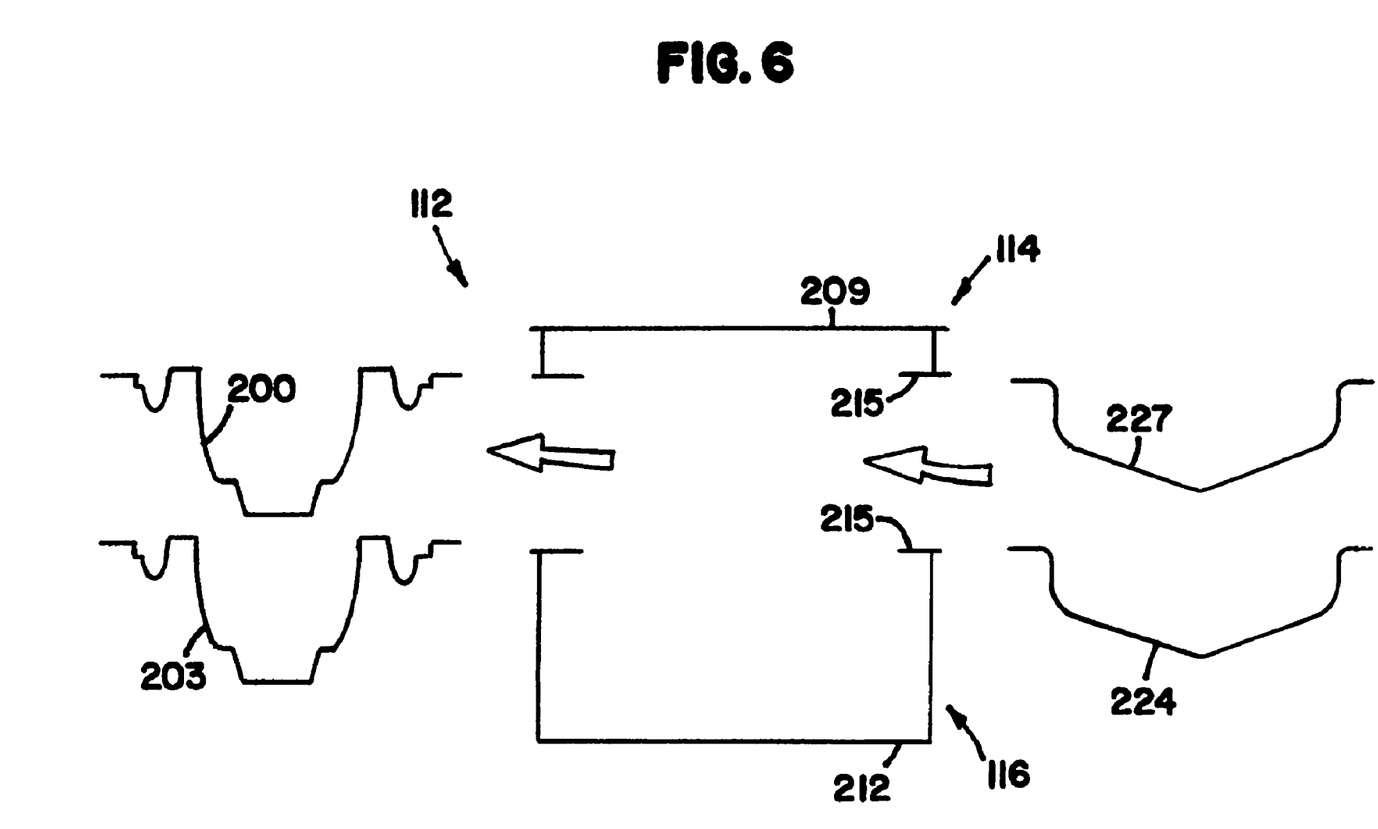
FIG. 6 is a simplified schematic of the apparatus shown in FIG. 4 illustrating the interchangeability of membranes.

In construction of a molding apparatus according to the invention, and as described above in connection with FIGS. 1-3, a master model can be used to create a pair of molding surfaces. As shown in FIGS. 4 through 6, one male mold membrane 200 and one female mold membrane 203 are produced to create the proper cavity size therebetween. Preferably, the sprue 164, sensors and any other hardware which must communicate through the mold membranes 200, 203 into the plenum 122 can be releasably connected using modular bulkhead fittings, such as the sprue bulkhead fitting 235 (FIG. 5) and passive proximity switch bulkheads 245.

The modular bulkhead fittings 235, 245 can be adapted to releasably connect the requisite molding hardware and sensors to the mold membranes 200, 203. In this manner, all of the necessary closed molding hardware and sensors can be quickly connected or removed from the mold skins 200, 203. The molding hardware and sensors can include, for example, sprues, automatic ejectors, and various sensors such as thermocouples and proximity switches. Consequently, it is not necessary to laminate each individual piece of hardware and sensor directly into the mold membrane. Instead, all hardware is releasably connected to the modular fittings 235, 245 for convenience and efficiency of changing out the molds. When the membranes 200, 203 are changed out, the quick connected hardware is simply disconnected form the changed out membranes 200, 203 and reconnected to modular fittings 235, 245 provided on the replacement mold membranes 224, 227 (FIG. 6). However, these components could be alternatively laminated molded directly into the mold membrane 200, 203 itself.

To construct the two mold halves, a pair of universal vessels 209, 212 are be created, one for the male membrane 200 and one for the female membrane 203. The framework of each universal vessel 209, 212, is provided with an outer skin 210, 213 (FIG. 5) which can be made from, for example, sheet metal, to form a rigid enclosed mold section 114, 116. Flanges 215 can be attached to each of the mold membranes 200, 203. Each mold membrane 200, 203 is attached to its own corresponding universal vessel 209, 212 via the flanges 215 to create a gas-tight seal between each universal vessels and its corresponding mold membrane. A single mold 112 comprised of two mold sections 114, 116 with attached mold membranes 200, 203 can be utilized to produce a variety of different parts simply by changing out the male 200 and female 203 mold membranes attached to each universal vessel 209, 212.

Although not shown in FIG. 4, each mold section 114, 116 can also be provided with the heating coils 56 described in connection with FIG. 2. The optional heating coils 56 can likewise be connected to the heater 160 and chiller 161 units for controlling the temperature of the backing gas 42.

Because each mold sections 114, 116 is gas filled, the mold has excellent thermal conductivity which allows for much improved temperature control of the mold surfaces which results in reduced cycle time and improved cosmetics. As shown in FIG. 6, molding differently configured parts is as simple as removing one set of mold membranes 200, 203 and replacing them with a differently configured set 227, 224. Some benefits of the floating mold are flexibility, reduced cost, speed to market and increased closed molding performance. For example, when a part design is changed, rather than creating new molds and obsoleting current molds, or performing expensive mold modifications, the molded membranes are simply changed out.

As shown in FIGS. 4-6, a good example of an application for the floating mold is the molding of boat decks and hulls. The molder can easily change out the membranes 200, 203 of the mold sections 114, 116 to create different parts whenever needed. The floating molds are designed to allow the entire mold to be changed out in less than ten minutes.

Because of the thin-skin configuration of the membranes, heat transfer control of the molded part is enhanced and the mold membranes can be formed more easily and less expensively. Preferably, each mold membrane can be formed from a highly thermally-conductive material.

While certain preferred embodiments of the invention have been disclosed and described herein, it should be appreciated that the invention is susceptible of modification without departing from the spirit of the invention or the scope of the following claims.

What is claimed is:

1. A method of molding an article comprising:
   (a) arranging first and second rigid mold sections in a spaced apart opposed relationship;
   (b) attaching a first membrane to the first mold section, the first member and the first mold section defining a first chamber;
   (c) attaching a second membrane to the second mold section, the second member and the second mold section defining a second chamber, the first and second members further defining a mold plenum between opposing surfaces of the first and second membranes;
   (d) filling and pressurizing the first and second chambers with a gas backing at a first gas pressure level;
   (e) injecting molding fluid into the mold plenum;
   (f) monitoring a flow rate of the molding fluid during injection into the mold plenum;
   (g) sensing at least one parameter to determine the amount of molding fluid injected into the mold plenum, wherein sensing the at least one parameter includes detecting displacement of molding fluid between the first and second fluid filled mold sections;
   (h) monitoring the gas pressure within the mold plenum; and
   (i) regulating the gas pressure within the first and second pressure chambers during the molding of the article.

2. The method of claim 1, further including controlling the flow in response to the at least one parameter.

3. The method of claim 2, wherein sensing at least one parameter further comprises sensing prevailing pressure at which the molding fluid is injected.

4. The method of claim 1 wherein, sensing the at least one parameter to determine the amount of molding fluid injected into the mold plenum further includes sensing prevailing pressure in one of the first and second chambers.

5. The method of claim 1 further comprising heating the molding fluid prior to injecting the molding fluid into the mold plenum.

6. The method of claim 1 further comprising heating the gas backing to a gas temperature prior to injecting molding fluid into the mold plenum.

7. The method of claim 6 further comprising regulating and selectively modulating the gas temperature after injecting molding fluid into the mold plenum.

8. A method of molding an article comprising:
(a) arranging first and second rigid mold sections in a spaced apart opposed relationship;
(b) attaching a first membrane to the first mold section, the first member and the first mold section defining a first chamber;
(c) attaching a second membrane to the second mold section, the second member and the second mold section defining a second chamber, the first and second members further defining a mold plenum between opposing surfaces of the first and second membranes;
(d) filling and pressurizing the first and second chambers with a gas backing at a first gas pressure level;
(e) injecting molding fluid into the mold plenum;
(f) monitoring a flow rate of the molding fluid during injection into the mold plenum;
(g) sensing at least one parameter to determine the amount of molding fluid injected into the mold plenum;
(h) controlling the flow in response to the at least one parameter;
(i) monitoring the gas pressure within the mold plenum; and
(j) regulating the gas pressure within the first and second pressure chambers during the molding of the article.

9. The method of claim 8, wherein sensing at least one parameter further comprises sensing prevailing pressure at which the molding fluid is injected.

10. A method of molding an article comprising:
(a) arranging first and second rigid mold sections in a spaced apart opposed relationship;
(b) attaching a first membrane to the first mold section, the first member and the first mold section defining a first chamber;
(c) attaching a second membrane to the second mold section, the second member and the second mold section defining a second chamber, the first and second members further defining a mold plenum between opposing surfaces of the first and second membranes;
(d) filling and pressurizing the first and second chambers with a gas backing at a first gas pressure level
(e) injecting molding fluid into the mold plenum;
(f) monitoring a flow rate of the molding fluid during injection into the mold plenum;
(g) sensing at least one parameter to determine the amount of molding fluid injected into the mold plenum;
(h) monitoring the gas pressure within the mold plenum; and
(i) regulating the gas pressure within the first and second pressure chambers during the molding of the article;
(j) wherein sensing the at least one parameter to determine the amount of molding fluid injected into the mold plenum further includes sensing prevailing pressure in one of the first and second chambers.

* * * * *